(12) United States Patent
Kolathur et al.

(10) Patent No.: US 10,547,554 B2
(45) Date of Patent: Jan. 28, 2020

(54) POLICY BASED AUTOMATIC FLOW COLLECTION DISCOVERY

(71) Applicant: Avago Technologies International Sales Pte. Limited, Singapore (SG)

(72) Inventors: Santhoshkumar Kolathur, Livermore, CA (US); George Levchenko, San Ramone, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/047,729

(22) Filed: Jul. 27, 2018

(65) Prior Publication Data

US 2019/0356597 A1    Nov. 21, 2019

Related U.S. Application Data

(60) Provisional application No. 62/672,475, filed on May 16, 2018.

(51) Int. Cl.
  *H04L 12/24*    (2006.01)
  *H04L 12/851*   (2013.01)
  *H04L 12/813*   (2013.01)
  *H04L 12/26*    (2006.01)

(52) U.S. Cl.
  CPC ........ *H04L 47/2483* (2013.01); *H04L 41/069* (2013.01); *H04L 41/12* (2013.01); *H04L 43/026* (2013.01); *H04L 47/20* (2013.01); *H04L 47/2441* (2013.01); *H04L 41/0893* (2013.01)

(58) Field of Classification Search
  CPC . H04L 47/2483; H04L 47/2441; H04L 47/20; H04L 41/069; H04L 41/12; H04L 43/026; H04L 41/0893; H04L 47/10; H04W 28/02; H04W 28/0205; H04W 28/021; H04W 28/0247; H04W 28/0252; H04W 28/0257; H04W 28/0263; H04W 28/0268; H04W 28/0273
  USPC ......................................................... 370/235
  See application file for complete search history.

(56) References Cited

U.S. PATENT DOCUMENTS

| | | | | |
|---|---|---|---|---|
| 8,793,361 B1* | 7/2014 | Riddle | ................ | H04L 47/2441 709/224 |
| 2001/0021176 A1* | 9/2001 | Mimura | ................ | H04L 1/0026 370/235 |
| 2009/0227228 A1* | 9/2009 | Hu | .......................... | H04L 12/14 455/406 |
| 2012/0167162 A1* | 6/2012 | Raleigh | .................... | G06F 21/57 726/1 |
| 2013/0033985 A1* | 2/2013 | Nakagawa | ............ | H04L 47/266 370/231 |
| 2014/0089500 A1* | 3/2014 | Sankar | .................. | H04L 47/125 709/224 |

(Continued)

*Primary Examiner* — Robert J Lopata
(74) *Attorney, Agent, or Firm* — Foley & Lardner LLP

(57) ABSTRACT

In some aspects, the disclosure is directed to methods and systems for automatically identifying a set of communications flows in a network environment, and grouping the identified set into a flow collection for management and monitoring. The system may dynamically maintaining the group membership, without requiring manual analysis and grouping. As a result, manual grouping of flows may be avoided, avoiding this complex, tedious, and error prone task, and allowing easier and more efficient administration and management.

20 Claims, 9 Drawing Sheets

(56) References Cited

U.S. PATENT DOCUMENTS

| | | | | |
|---|---|---|---|---|
| 2015/0026794 A1* | 1/2015 | Zuk | ............... | H04L 63/0227 |
| | | | | 726/13 |
| 2016/0043901 A1* | 2/2016 | Sankar | ............ | H04L 67/1031 |
| | | | | 709/226 |
| 2017/0005937 A1* | 1/2017 | Morita | ............ | H04L 43/0864 |
| 2017/0188232 A1* | 6/2017 | Raleigh | ............ | H04W 12/06 |
| 2017/0353383 A1* | 12/2017 | Hughes | ............ | H04L 45/38 |
| 2018/0227203 A1* | 8/2018 | Khan | ............ | H04L 67/1095 |
| 2018/0278498 A1* | 9/2018 | Zeng | ............ | H04L 43/045 |

* cited by examiner

*FIG. 2E*

POLICY BASED AUTOMATIC FLOW COLLECTION DISCOVERY

RELATED APPLICATIONS

The present application claims the benefit of and priority to U.S. Provisional Patent Application No. 62/672,475, entitled "Policy Based Automatic Flow Collection Discovery," filed May 16, 2018, the entirety of which is incorporated by reference herein.

FIELD OF THE DISCLOSURE

This disclosure generally relates to systems and methods for monitoring and management of data flows, particularly with storage area networks.

BACKGROUND OF THE DISCLOSURE

Communications between devices may be analyzed on a per-flow basis, with each flow comprising a set of communications between a particular set of endpoints and related to a particular application, such as a flow between a client and server related to a file transfer. Endpoints may include servers, storage devices, virtual machine, client devices, or any other such device.

Flows may be logically grouped based on endpoints or applications, for purposes such as monitoring, investigating, and troubleshooting performance of servers, storage devices or logical units, and/or applications. Administrators may group flows based on logical unit number (LUN), server or other device, or application, and may use aggregation or thresholding functions for monitoring and troubleshooting.

In conventional systems, administrators may need to manually create collections or groups of flows. This requires an in-depth knowledge of end device addresses, connectivity, flow definitions, zone aliases, etc., and may be complex and cumbersome even for an expert user. Furthermore, in very large deployments with many hundreds or thousands of flows, it may not be feasible to manually analyze and configure each flow to be part of a group or collection.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 2A-2F are screenshots of an implementation of an application for monitoring and managing communications flows, according to some implementations;

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for policy based automatic flow collection discovery; and Section B describes a network environment and computing environment which may be useful for practicing embodiments described herein.

A. Policy Based Automatic Flow Collection Discovery

Communications between devices may be analyzed on a per-flow basis, with each flow comprising a set of communications between a particular set of endpoints and related to a particular application, such as a flow between a client and server related to a file transfer. Endpoints may include servers, storage devices, virtual machine, client devices, or any other such device.

Flows may be logically grouped based on endpoints or applications, for purposes such as monitoring, investigating, and troubleshooting performance of servers, storage devices or logical units, and/or applications. Administrators may group flows based on logical unit number (LUN), server or other device, or application, and may use aggregation or thresholding functions for monitoring and troubleshooting.

In conventional systems, administrators may need to manually create collections or groups of flows. This requires an in-depth knowledge of end device addresses, connectivity, flow definitions, zone aliases, etc., and may be complex and cumbersome even for an expert user. Furthermore, in very large deployments with many hundreds or thousands of flows, it may not be feasible to manually analyze and configure each flow to be part of a group or collection.

Instead, the systems and methods discussed herein provide an intuitive user interface and system-assisted tool to simplify analysis and grouping of flows in network flow collections through policy based automated discovery.

Figure 1:
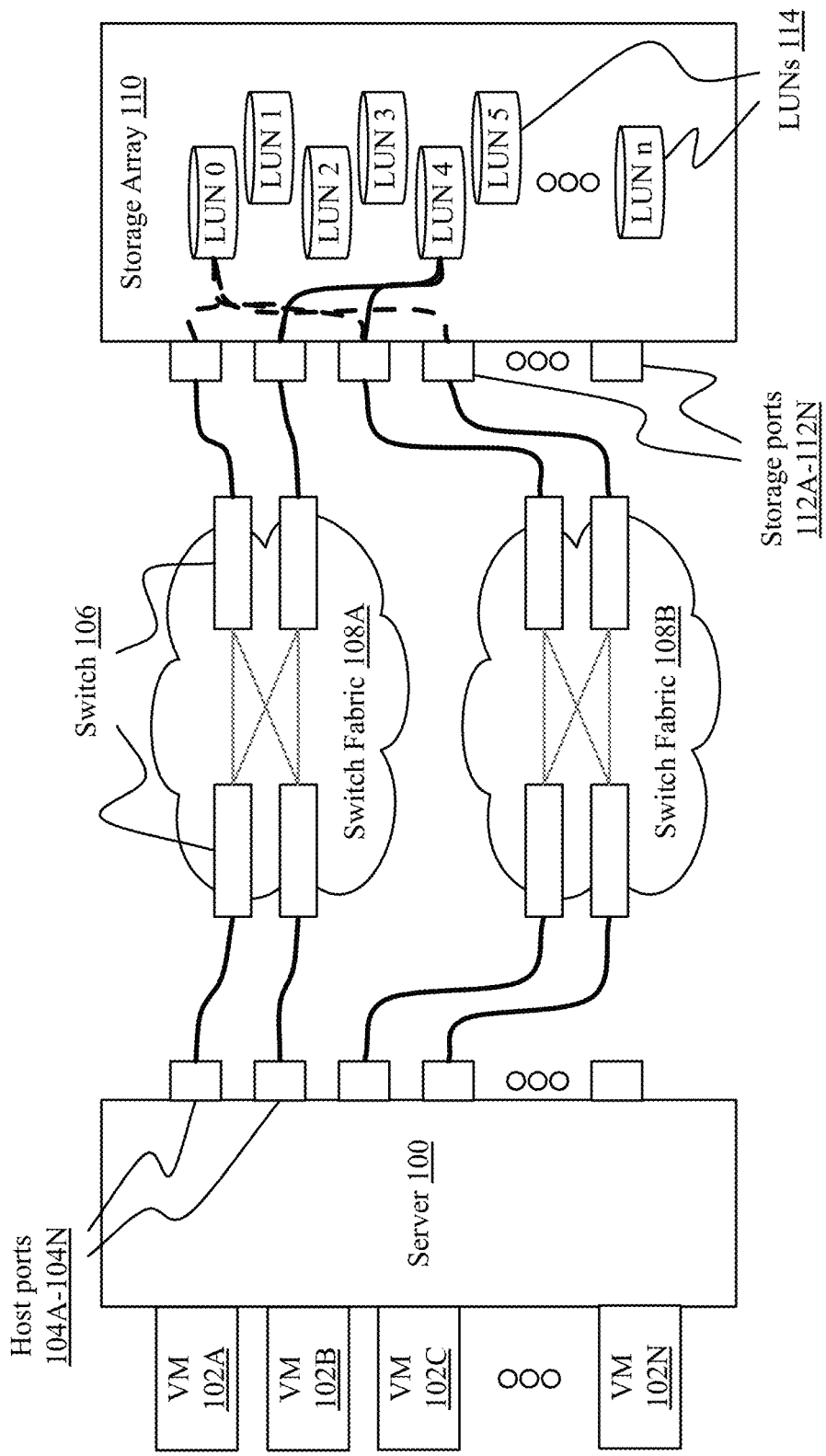
FIG. 1 is a block diagram depicting a network environment for monitoring and managing communications flows, according to some implementations.

FIG. 1 is a block diagram depicting a network environment for monitoring and managing communications flows, according to some implementations. In the implementation shown, a server 100 executing a plurality of virtual machines 102A-102N (generally referred to as virtual machine(s) 102) may include a plurality of host ports 104A-104N (generally referred to as host port(s) 104). Server 100 may be any type and form of computing device, including a rackmount computer, desktop computer, blade server, workstation, laptop computer, wearable computer, tablet computer, or any other type of computing device. In other implementations, server 100 may be replaced by one or more computing devices, such as client devices. In some implementations, server 100 may comprise a plurality of servers, such as a server farm, cluster, or cloud. Server 100 may comprise physical machines or virtual machines executed by one or more physical machines.

In many implementations, server 100 may communicate with one or more storage devices or logical units, which may be identified by logical unit numbers (LUNs) 114. The storage devices may be configured in a storage array 110, such as a RAID array, storage area network (SAN), or other such configuration. The storage devices may store data, applications, operating system files, or any other type and form of data. Server 100 may communicate with storage array 110 via a plurality of communication paths. For example, as shown, server 100 may communicate with storage array 110 to request and receive data, write data, or otherwise utilize the storage devices via a plurality of switches 106 connected to host ports 104 and storage device ports 112A-112N (referred to generally as storage port(s) 112). Switches 106 may comprise any type and form of network switches, including managed or unmanaged switches, crossbar switches, etc. Additional devices not illustrated may be included in the network, such as gateways, access points, firewalls, network accelerators, proxies, caches, or other such devices. In many implementations, switches 106 may be divided or grouped into one or more switch fabrics (e.g. 108A-108B, as shown, referred to generally as switch fabric(s) 108). Switch fabrics 108 may comprise interconnections between a plurality of switches 106 and may control routing, load balancing, and/or scheduling of communications between server 100 and storage array 110.

Communications flows between server 100 and LUNs may be identified and grouped. These flows may be identified according to host ports 104, storage ports 112, and LUNs 114. For example, in the example implementation shown, four flows go to a single LUN, LUN 0 (illustrated with dashed lines). These flows may be distributed across source and destination ports and be identified as:

Host port #1 104A—storage port #1 112A—LUN 0;
Host port #2 104B—storage port #2 112B—LUN 0;
Host port #3 104C—storage port #3 112C—LUN 0; and
Host port #4 104D—storage port #4 112D—LUN 0.

In other implementations, multiple flows may travel via the same host port and/or storage port. In many implementations, the combination of storage port 112 and LUN 114 may be identified by a world wide name (WWN) or similar identifier. Thus, for example, the WWN may be the same for the combination of storage port #1, LUN 0; storage port #2, LUN 0; storage port #3, LUN 0; and storage port #4, LUN 0.

Similarly, flows may be identified according to an application. An application may utilize multiple storage devices in the array 110, such as application storage and database storage, user storage, etc. In one example, the flows for an application may be identified as:

Host port #1 104A—storage port #1 112A—LUN 0;
Host port #2 104B—storage port #2 112B—LUN 0;
Host port #3 104C—storage port #3 112C—LUN 0;
Host port #4 104D—storage port #4 112D—LUN 0;
Host port #2 104B—storage port #2 112B—LUN 4; and
Host port #3 104C—storage port #3 112C—LUN 4.

As shown, flow groupings for applications may be complex, even in a limited example. When there are hundreds of thousands flows going through the storage network, creating logical groups of flows become extremely tedious and error prone. Furthermore, maintaining membership of these collections or groupings is nearly impossible when done manually.

Instead, the present systems and methods use various discovery methods to identify flows to include within a logical group, and may generate such groups automatically. Policies may be used to select flows, and may be enabled or disabled via a user interface. The policies may include, in various implementations:

Application Centric Collections
LUN Centric Collections
Server Centric Collections
Zone Centric Collections An administrator may choose one or more policies to be in effect. Once policies are selected, the system may generate the flow collections based on the policy or policies in effect and may present the results to the administrator. The administrator may select and create these collections with a single click. Once the collections are created, the system will continue monitoring them against the selected policy and keep their membership up to date as and when new flows are detected and analyzed.

For application centric collection, in some implementations, the administrator may specify a regex pattern or identify an application name used as part of server aliases (e.g. "www", or "mail", or "rdp", etc.). The system may use this regex pattern or name to determine flows that are part of the same application group traversing from servers, e.g. based on application layer or session layer headers or payloads, based on metadata of the packet, or other such information. In other implementations, the system may look up all LUNs in storage array 110 and may map them based on the LU-WWN identifiers. The system may then identify each Initiators (e.g. host ports 104) for these LUNs. In some implementations, the system may reverse look up all LUNS these discovered Initiators are in communication with. For example, the system may identify LUN 0 and LUN 1 as corresponding to a first application, and may identify that these LUNs are communicating with host ports 104C and 104D. The system may then determine that host ports 104C and 104D communicate with LUNs 0, 1, 4, and 6. Each identified flow from the identified host ports and destination LUNs (e.g. 104C, 104D, to LUNs 0, 1, 4, and 6) may then be grouped into an application collection.

For LUN centric collections, the system may map each LUN 114 based on an identifier such as a LUN serial number (LSN). For each LUN, the system may identify initiator-target-LUN (ITL) combinations utilizing said LUN, and may group all flows including the ITL combination into a storage LUN collection.

For Server centric collections, the system may identify flows either based on physical attributes (e.g. workstation, blade, etc.) or based on a logical attribute (e.g. zone alias, via a regex matching to alias names). The system may look up initiator ports based on the enclosure or zone alias, and may look up ITL combinations for the initiators. Each flow having the corresponding ITL combination may be grouped into a server collection.

For Zone centric collections, the system may identify flows based on regex matching to a zone name or partial zone name, and flows may be grouped based on matching either initiator or target for the zone.

Figure 2A:
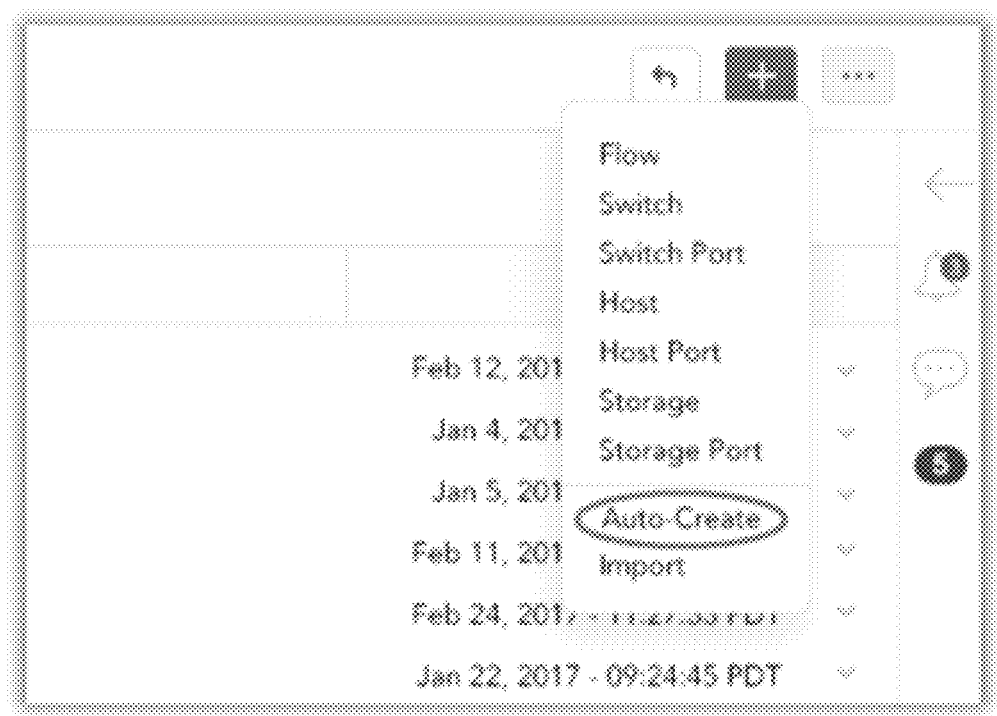
Figure 2B:
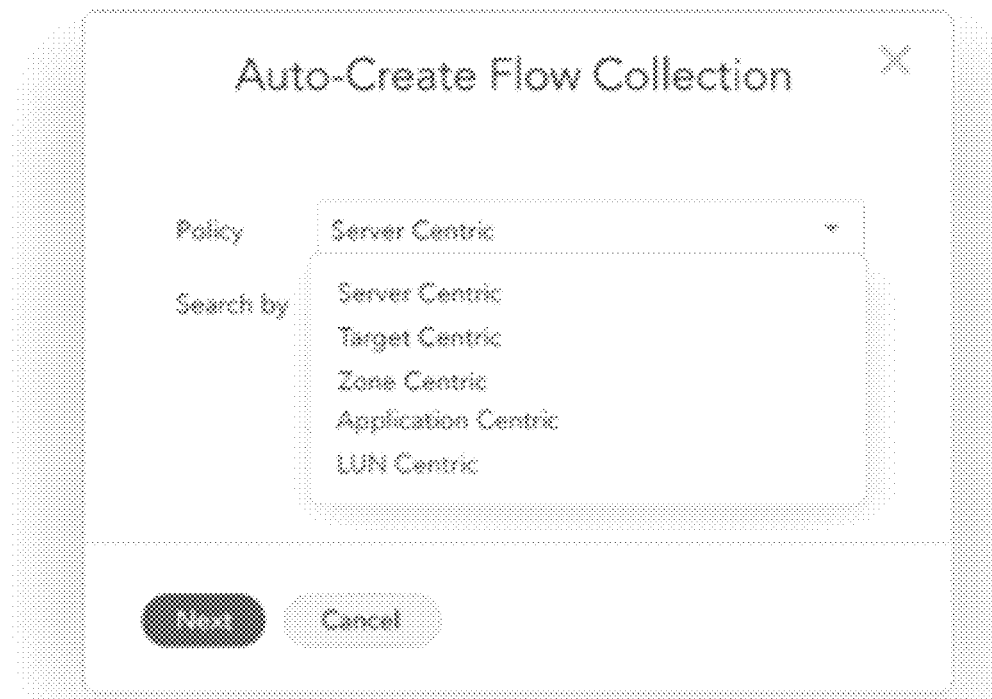
Figure 2C:
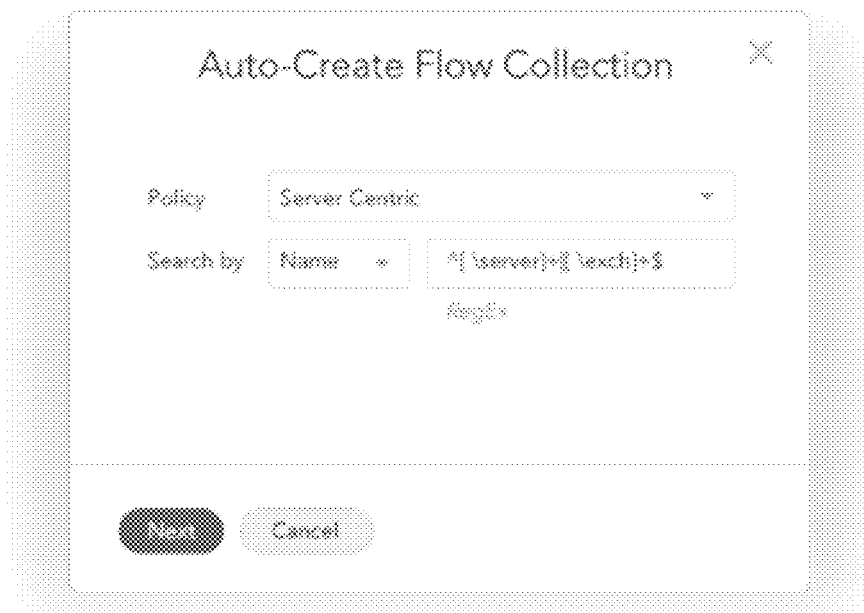
Figure 2D:
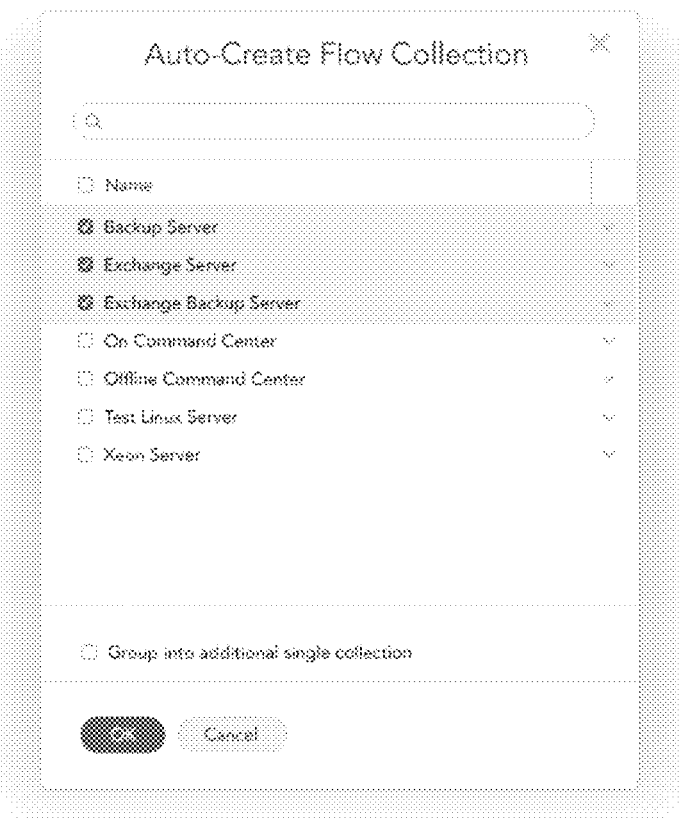

After the administrator has selected policies or other options, the collections may be created and listed in a user interface for the collections. The administrator may perform additional operations on a per collection basis, such as aggregating collections, creating and assigning rules sets for threshold monitoring, etc. For example, FIGS. 2A-2F are screenshots of an implementation of such a user interface. FIG. 2A is a screenshot showing an auto-creation command in a user interface. Responsive to selection of the auto-creation command, the user interface may display a list of policies that may be applied (e.g. server centric, target centric, zone centric, application centric, and LUN centric), as shown in FIG. 2B. As shown in FIG. 2C, the user may select an appropriate policy type (e.g. server centric, as shown) and may add a search expression (e.g. RegEx expression) to select corresponding entities (e.g. servers, for a server centric policy; applications for an application centric policy, etc.). The entities may be searched by name, by address, by port, by application name, or any other type and form of characteristic. The resulting flow collections may be identified and listed, as in FIG. 2D. In the example implementation shown, the system has identified seven groups of communication flows, e.g. corresponding to a backup server, an exchange server, an exchange backup server, an online command center server, an offline command center server, a test Linux server, and a Xeon server. In some implementations as shown in FIG. 2D, multiple collections may be identified and grouped into a single collection, e.g. responsive to an administrator or user selection. This may allow the administrator to group automatically discovered collections for related applications, for example.

Figure 2E:
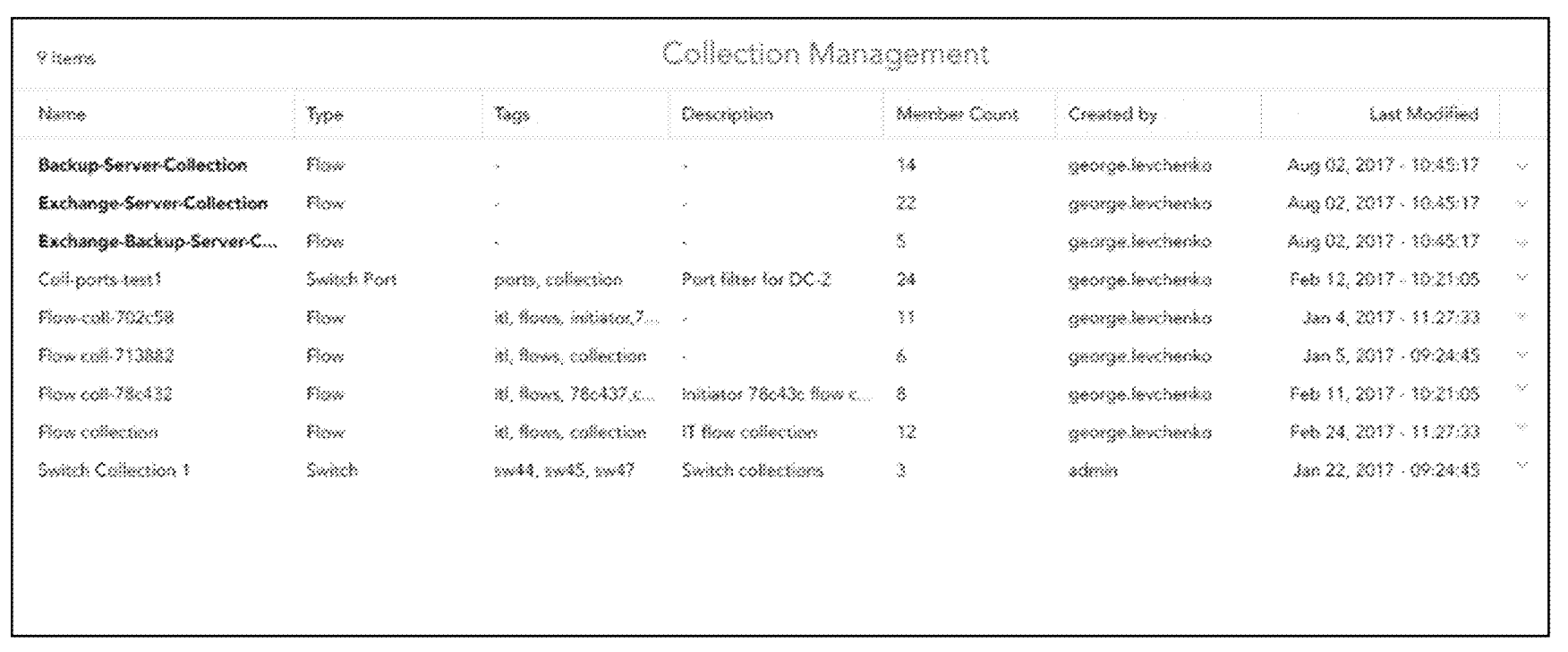

In the example illustrated in FIG. 2D, the user has selected the first three identified flows (e.g. flows to the backup server, exchange server, and exchange backup server). FIG. 2E is a screenshot of a resulting report or collection management view. The newly added policies generated from the user selections may be identified, e.g. via bold text, highlighting, or a similar interface element. As shown, the collection management view may include both new policies and previously established policies. Each policy may have a number of members identified by the system. For example, the backup server collection policy may be associated with 14 flows identified by the system, as shown in the example of FIG. 2E.

Figure 2F:

The user may select any policy identified in the collection management view in order to "drill down" or obtain further information and/or to set additional configuration parameters or metadata for the policy. For example, FIG. 2F is a screenshot of an example of a configuration or detail view of a policy. In the example shown, further details about the newly created policy for the backup server collection are shown. As shown, the user may edit the name of the policy, and add tags and/or a description. Tags may be used for organization or sorting purposes, such as in the management view of FIG. 2E. Still referring to FIG. 2F, a set of flows automatically identified by the system during creation of the policy (e.g. responsive to matching the RegEx search) may be listed, and may be identified by one or more of a initiator device identifier; target device identifier; LUN (if applicable); virtual tap or vTap, identifying traffic flows between virtual machines; zones, or any other such information. Flows may also be identified by a status, such as active, closed, suspended, terminated, or any other such status. As shown, the user may manually remove flows from the list, and/or may manually add additional flows.

The user may also configure one or more rules for the policy. These rules may be applied by the system to the flows of the policy, and may include routing rules (e.g. forwarding, copying, etc.), filtering rules (e.g. whitelists or blacklists), encryption, quality of service (QoS) prioritization, load balancing rules, or any other type and form of rule. Rules may be applied directly by the management system in some implementations, or may be provided to other devices (e.g. routers, load balancers, firewalls, etc.) for application on network flows. In some implementations, the management system may translate the rules into proprietary formats for different devices in the network. For example, the management system may translate rules into a first proprietary format for devices manufactured by a first manufacturer, and a second proprietary format for devices manufactured by a second manufacturer. The management system may thus allow management and oversight of policies applied by multiple devices to network flows in a unified, easy to use interface.

The policy and filter conditions used to identify the flows may be saved as part of the collection definition. This way, the membership for these collections can be dynamically updated based on new information as and when available to the system.

Figure 3:
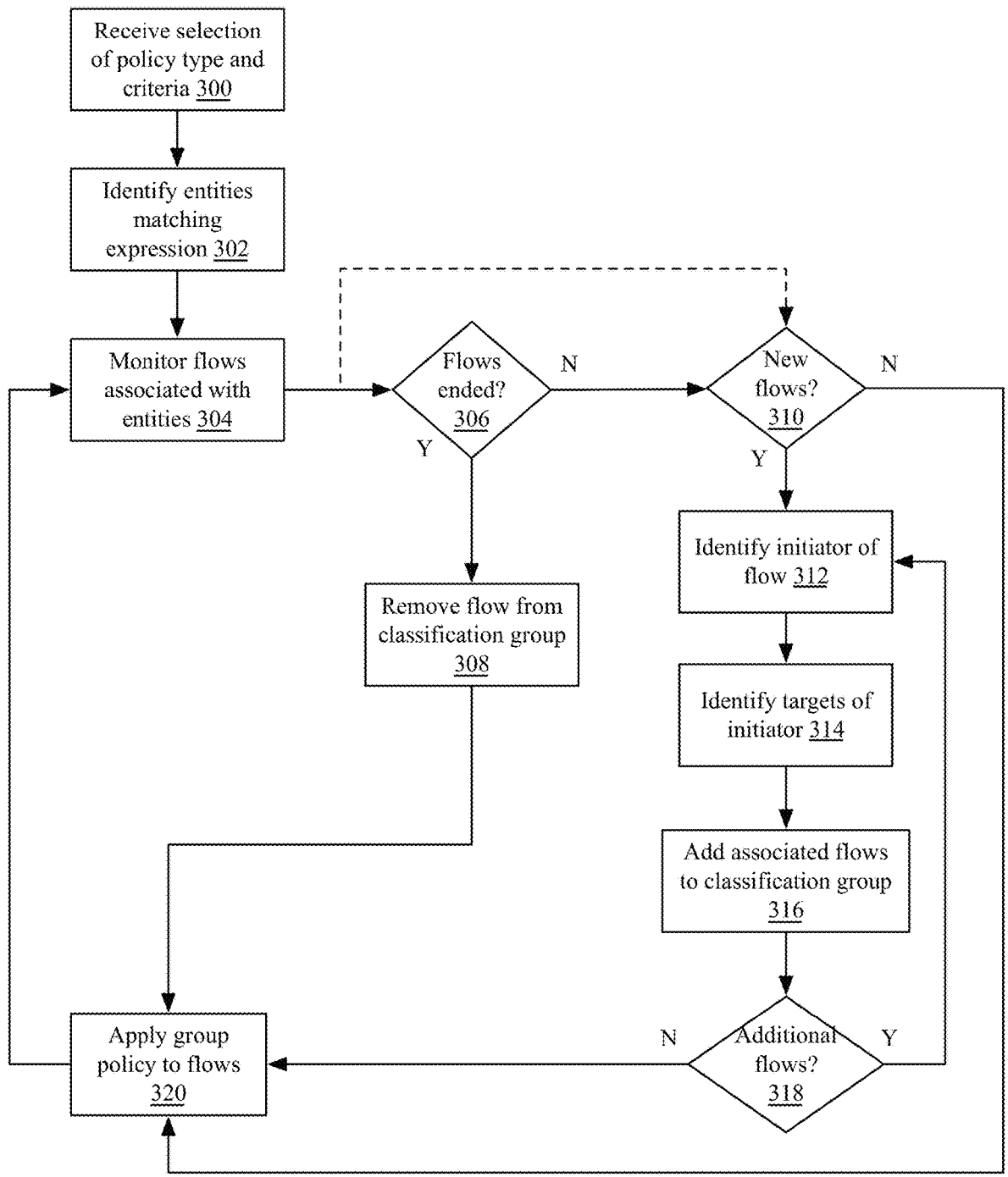
FIG. 3 is a flow chart of an implementation of a method for management of communications flows.

Referring now to FIG. 3, illustrated is a flow chart of an implementation of a method for management of communications flows. In some implementations, at step 300, a management device may receive a selection of a policy type and a criteria. The management device may receive the selection from a second device, or via a user interface or management console interface provided by the management device. The policy type selections may include server centric, target centric, zone centric, application centric, or LUN centric, as discussed above, or any other type of policy (e.g. device centric, subnet centric, user group centric, etc.). The criteria may comprise an identification of a criteria, such as a regex expression to be matched. The expression may comprise Boolean logic, alphanumeric characters, IP address ranges or port numbers, LUN types, application names, or any other type and form of criteria.

At step 302 in some implementations, the management device may identify entities matching the expression from entities associated with the system. Entities may refer to servers or other computing devices, applications, LUNs, storage devices, switches, ports, zones, virtual machines, clusters, or any other type and form of device, zone, or application corresponding to a policy selection type. The entities may be matched from a database of identified entities, which may be manually added, automatically discovered through a discovery protocol, etc., or the entities may be matched dynamically according to a discovery protocol. For example, in some implementations, the management device may transmit a request for devices on the network to identify themselves, and may receive one or more responses from the devices including device identifiers, names, or other information. The management device may select entities from the responses based on the device identifiers, names, or other information matching the expression. In other implementations, devices may periodically identify themselves to the network via a broadcast.

Once a set of entities matching the expression are identified, at step 304, the management device may monitor flows associated with the identified entities. In some implementations, step 304 may be performed prior to steps 300-302, and identified or monitored flows may be logged. Once the policy type and criteria are received, the management device may then identify selected entities from the log. This may allow for continuous monitoring of the flow and quick setup of new policies without requiring an administrator or user to wait for flows to be identified.

Skipping ahead to step 310 (e.g. during initial set up of a new policy), any new flows associated with the selected entities may be identified. For each flow, in some implementations at step 312, the management device may identify an initiator of the flow, which may be the selected entity or another entity such as another computing device (e.g. a client device in communication with a storage device or server). At step 314, targets of the identified initiator may be identified, in a "reverse" lookup. At step 316, the flow between the selected entity and the initiator, as well as flows between the initiator and targets may be added to a classification group. For example and as discussed above, given a first flow between a selected first entity (e.g. a storage device) and a second entity (e.g. a client device), at step 312, the management device may identify an initiator of the flow (e.g. the client device). At step 314, the management device may identify other flows from the initiator, such as a second flow between the client device and an application server. The first flow and second flow may both be added to the classification group at step 316 in some implementations. This allows for automatic grouping of flows related to a single application that may be between different devices (e.g. a client device and an application server, as well as the client device and a storage server storing user data for use by the application, or the client device and a database server providing a data repository for the application). At step 318, the management device may determine if there are additional new flows, and if so, steps 312-316 may be repeated for each flow.

Once all associated flows have been identified, at step 320, the management device may apply a policy comprising one or more rules to the associated flows in the classification group. Applying the rules may include modifying packet headers (e.g. for reprioritization, forwarding, load balancing, or other such functions), forwarding packets, compressing packets, encrypting packets, buffering packets, caching packets, and/or instructing additional network devices to perform such functions (e.g. by transmitting instructions to another device, such as a router, to modify a routing table).

The management device may continue monitoring the flows at step 304. If no new flows are identified, then the management device may similarly continue applying the classification policy to the associated flows, and continue monitoring the flows. If new flows are identified (e.g. as applications are executed, clients come online, etc.), then steps 310-318 may be repeated. Similarly, flows may be terminated, such as when applications are closed or clients go offline. At step 306, the management device may determine if any flows have ended or been terminated. If so, then at step 308, the management device may remove the terminated or ended flow from the classification group. This may allow for automatic and dynamic maintenance of the flow policies, removing obsolete flows from inclusion in the policy, and preventing the policy configuration information from becoming large and unwieldy.

As discussed above, after the policy is generated and/or as flows are added to or removed from the classification group for the policy, a management interface may be updated dynamically with a listing of active and associated flows for the policy (e.g. as shown in FIG. 2E). This may allow for easy and efficient management of flows and policies.

Accordingly, the system and methods discussed herein provide for automatically identifying a correct set of flows, grouping them, and dynamically maintaining the group membership, without requiring manual analysis and grouping. As a result, the complex, tedious, and error prone manual grouping may be avoided, allowing easier and more efficient administration and management. The system is completely policy driven and very minimal inputs are needed from the administrator.

In one aspect, the present disclosure is directed to a method for management of communications flows. The method includes identifying, by a management device from a plurality of devices, a first subset of devices associated with a given criteria. The method also includes determining, by the management device via monitoring of a first plurality of communications flows between the first subset of devices and one or more initiator endpoints, a subset of initiator endpoints that communicate with the identified first subset of devices. The method also includes adding, by the management device, each flow between the subset of initiator endpoints and the first subset of devices to a flow classification group. The method also includes identifying, by the management device via monitoring of a second plurality of communications flows between the subset of initiator endpoints and the plurality of devices, a second subset of devices that are targets of the communications flows from the initiator endpoints. The method also includes adding, by the management device, each flow between the subset of initiator endpoints and the second subset of devices to the flow classification group; and applying, by the management device, a processing policy to each flow of the flow classification group.

In some implementations, the first subset of devices and second subset of devices comprise storage devices. In some implementations, the method includes providing the processing policy to a network device deployed as an intermediary between a first initiator endpoint of the subset of initiator endpoints and a device of the first or second subset of devices. In some implementations, the criteria comprises an application name, a logical unit number (LUN), a server name, or a zone name.

In some implementations, the method includes receiving the criteria, by the management device, via a user interface. In some further implementations, the criteria comprises a search expression received via the user interface; and the method includes identifying devices matching the search expression, by the management device, from criteria of devices identified in a database of the management device In some implementations, the method includes subsequently identifying a new flow between one of the subset of initiator endpoints and one of the first subset of devices or second subset of devices; and responsive to the identification of the new flow, adding the new flow to the flow classification group. In some implementations, the method includes subsequently determining that a flow between one of the subset of initiator endpoints and one of the first subset of devices or second subset of devices has terminated; and responsive to the determination that the flow has been terminated, removing the terminated flow from the flow classification group.

In some implementations, the method includes extracting, from a log generated by the management device via monitoring of the first plurality of communications flows, a subset of flows having the first subset of devices as endpoints, the log identifying each endpoint of a flow. In some further implementations, monitoring of the first plurality of communications flows and generation of the log are performed prior to identifying the first subset of devices associated with the given criteria.

In another aspect, the present disclosure is directed to a system for management of communications flows, comprising a management device in communication with a plurality of devices. The management device includes a processor configured to identify, from the plurality of devices, a first subset of devices associated with a given criteria. The processor is also configured to determine, via monitoring of a first plurality of communications flows between the first subset of devices and one or more initiator endpoints, a subset of initiator endpoints that communicate with the identified first subset of devices. The processor is also configured to add each flow between the subset of initiator endpoints and the first subset of devices to a flow classification group. The processor is also configured to identify, via monitoring of a second plurality of communications flows between the subset of initiator endpoints and the plurality of devices, a second subset of devices that are targets of the communications flows from the initiator endpoints. The processor is also configured to add each flow between the subset of initiator endpoints and the second subset of devices to the flow classification group, and apply a processing policy to each flow of the flow classification group.

In some implementations of the system, the first subset of devices and second subset of devices comprise storage devices. In some implementations of the system, the management device is further configured to provide the processing policy to a network device deployed as an intermediary between a first initiator endpoint of the subset of initiator endpoints and a device of the first or second subset of devices. In some implementations of the system, the criteria comprises an application name, a logical unit number (LUN), a server name, or a zone name.

In some implementations of the system, the management device is further configured to receive the criteria via a user interface. In a further implementation, the criteria comprises a search expression received via the user interface; and the management device is further configured to identify devices matching the search expression, by the management device, from criteria of devices identified in a database of the management device.

In some implementations of the system, the management device is further configured to: subsequently identify a new flow between one of the subset of initiator endpoints and one of the first subset of devices or second subset of devices; and responsive to the identification of the new flow, add the new flow to the flow classification group.

In some implementations of the system, the management device is further configured to: subsequently determine that a flow between one of the subset of initiator endpoints and one of the first subset of devices or second subset of devices has terminated; and responsive to the determination that the flow has been terminated, remove the terminated flow from the flow classification group.

In some implementations of the system, the management device is further configured to extract, from a log generated by the management device via monitoring of the first plurality of communications flows, a subset of flows having the first subset of devices as endpoints, the log identifying each endpoint of a flow. In a further implementation, monitoring of the first plurality of communications flows and generation of the log are performed prior to identifying the first subset of devices associated with the given criteria.

B. Computing and Network Environment

Figure 4A:
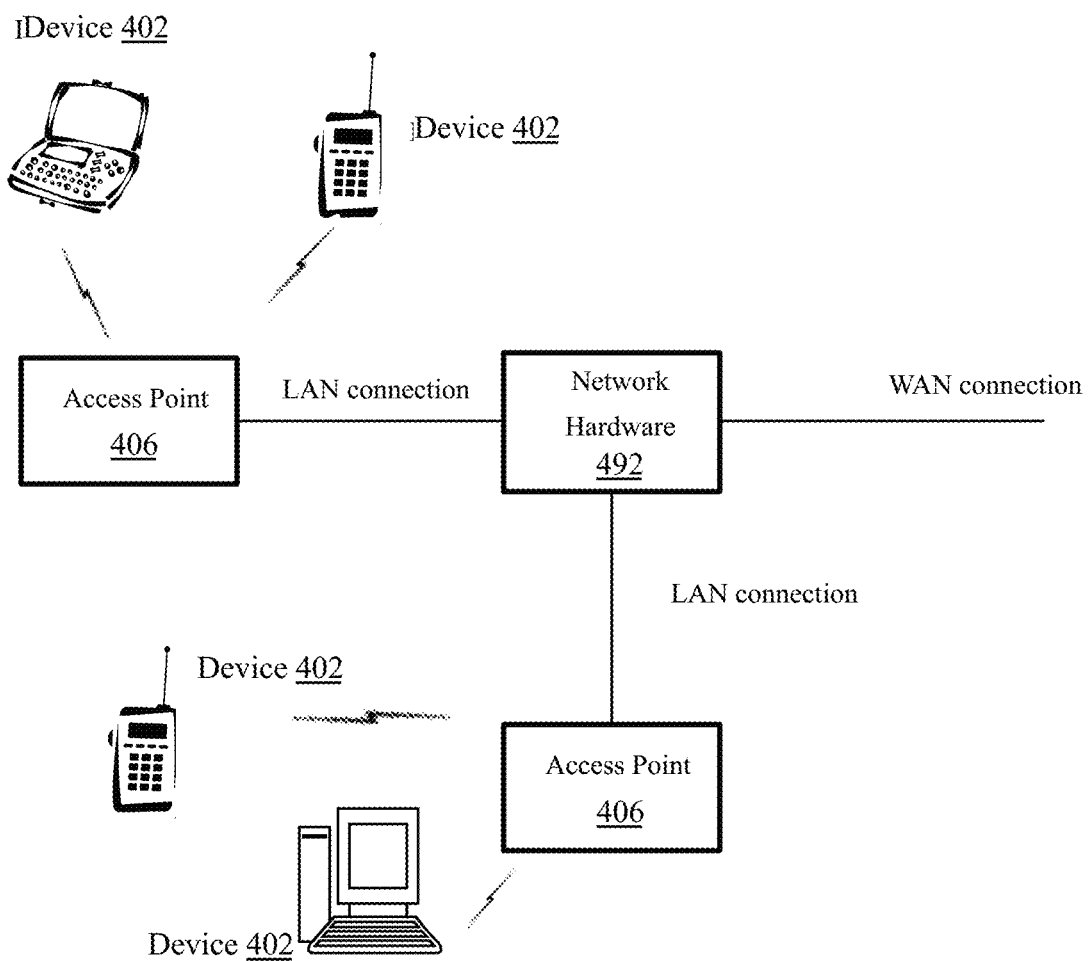
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
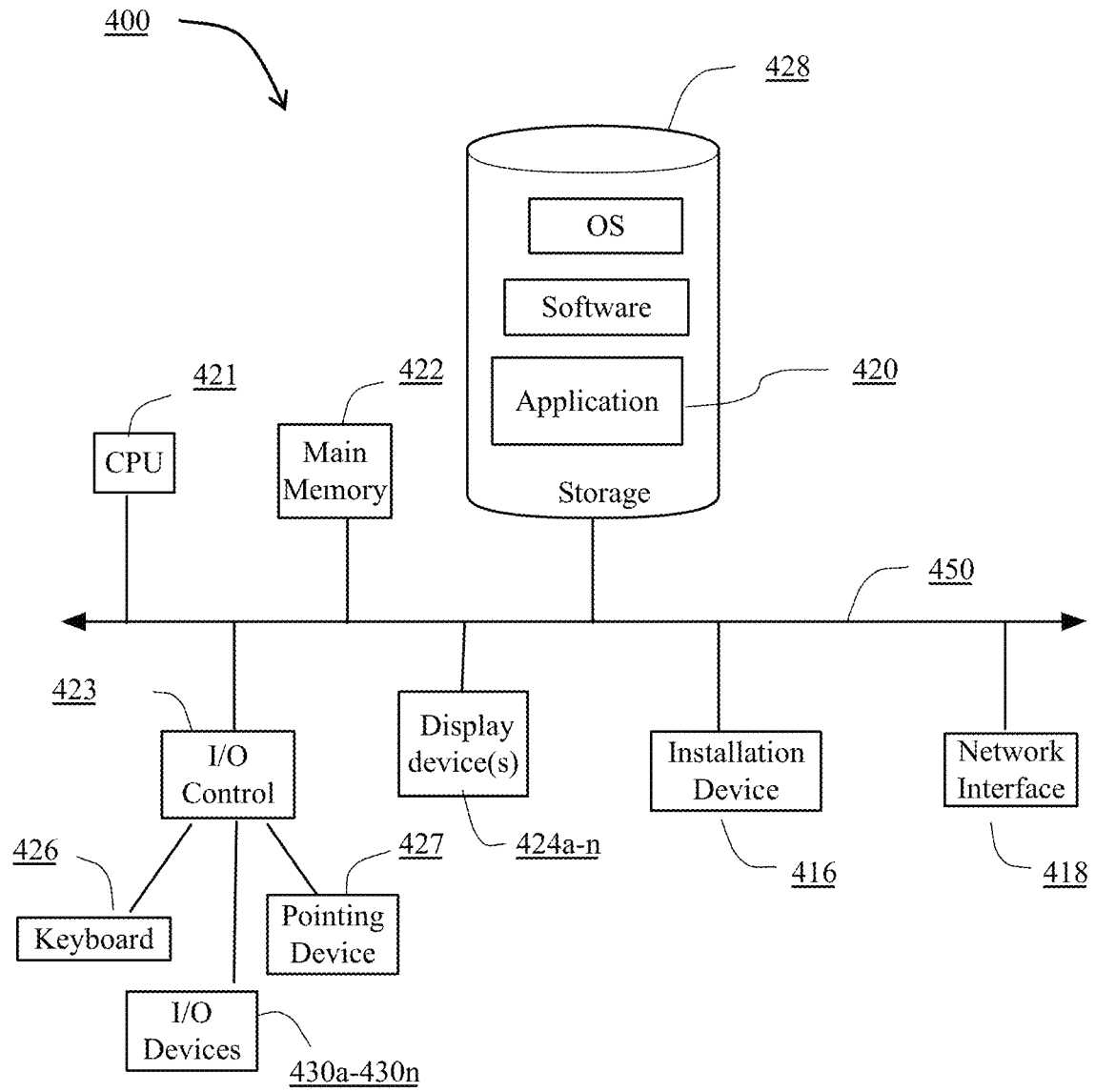
FIGS. 4B and 4C are block diagrams depicting embodiments of computing devices useful in connection with the methods and systems described herein.
Figure 4C:
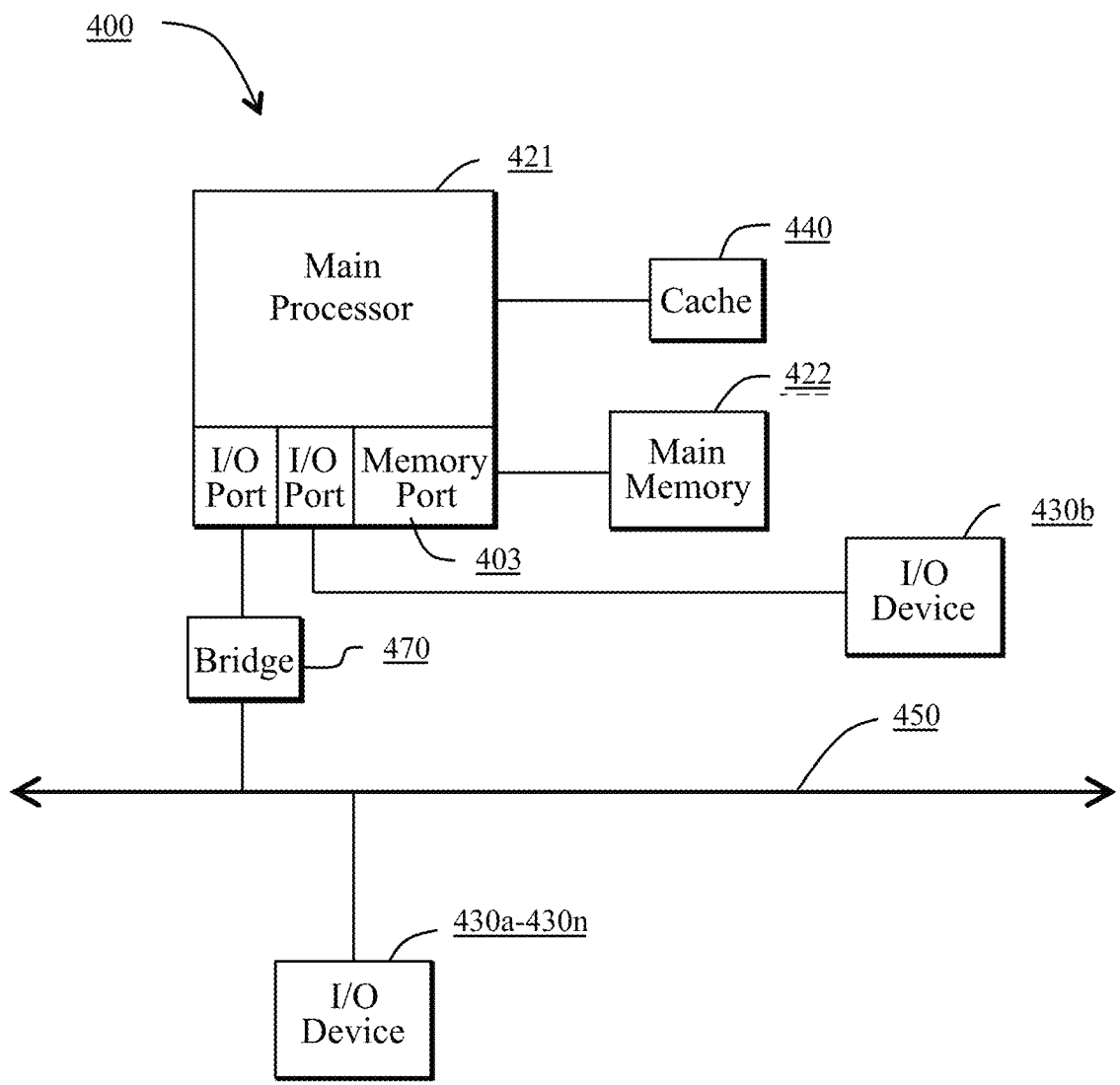

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for management of communications flows, comprising:
identifying, by a management device from a plurality of devices, a first subset of devices associated with a given criteria;
determining, by the management device via monitoring of a first plurality of communications flows between the first subset of devices and one or more initiator endpoints, a subset of initiator endpoints that communicate with the identified first subset of devices;
adding, by the management device, each flow between the subset of initiator endpoints and the first subset of devices to a flow classification group;
identifying, by the management device via monitoring of a second plurality of communications flows between the subset of initiator endpoints and the plurality of devices, a second subset of devices that are targets of the communications flows from the initiator endpoints;
adding, by the management device, each flow between the subset of initiator endpoints and the second subset of devices to the flow classification group; and
applying, by the management device, a processing policy to each flow of the flow classification group.

2. The method of claim 1, wherein the first subset of devices and second subset of devices comprise storage devices.

3. The method of claim 1, wherein applying the processing policy further comprises providing the processing policy to a network device deployed as an intermediary between a first initiator endpoint of the subset of initiator endpoints and a device of the first or second subset of devices.

4. The method of claim 1, wherein the criteria comprises an application name, a logical unit number (LUN), a server name, or a zone name.

5. The method of claim 1, further comprising receiving the criteria, by the management device, via a user interface.

6. The method of claim 5, wherein the criteria comprises a search expression received via the user interface; and further comprising identifying devices matching the search expression, by the management device, from criteria of devices identified in a database of the management device.

7. The method of claim 1, further comprising:
subsequently identifying a new flow between one of the subset of initiator endpoints and one of the first subset of devices or second subset of devices; and
responsive to the identification of the new flow, adding the new flow to the flow classification group.

8. The method of claim 1, further comprising:
subsequently determining that a flow between one of the subset of initiator endpoints and one of the first subset of devices or second subset of devices has terminated; and
responsive to the determination that the flow has been terminated, removing the terminated flow from the flow classification group.

9. The method of claim 1, wherein determining the subset of initiator endpoints that communicate with the identified first subset of devices further comprises extracting, from a log generated by the management device via monitoring of the first plurality of communications flows, a subset of flows having the first subset of devices as endpoints, the log identifying each endpoint of a flow.

10. The method of claim 9, wherein monitoring of the first plurality of communications flows and generation of the log are performed prior to identifying the first subset of devices associated with the given criteria.

11. A system for management of communications flows, comprising:
a management device in communication with a plurality of devices, the management device comprising a processor configured to:
identifying, from the plurality of devices, a first subset of devices associated with a given criteria,
determine, via monitoring of a first plurality of communications flows between the first subset of devices and one or more initiator endpoints, a subset of initiator endpoints that communicate with the identified first subset of devices,
add each flow between the subset of initiator endpoints and the first subset of devices to a flow classification group,
identify, via monitoring of a second plurality of communications flows between the subset of initiator endpoints and the plurality of devices, a second subset of devices that are targets of the communications flows from the initiator endpoints,
add each flow between the subset of initiator endpoints and the second subset of devices to the flow classification group, and
apply a processing policy to each flow of the flow classification group.

12. The system of claim 11, wherein the first subset of devices and second subset of devices comprise storage devices.

13. The system of claim 11, wherein the management device is further configured to provide the processing policy to a network device deployed as an intermediary between a first initiator endpoint of the subset of initiator endpoints and a device of the first or second subset of devices.

14. The system of claim 11, wherein the criteria comprises an application name, a logical unit number (LUN), a server name, or a zone name.

15. The system of claim 11, wherein the management device is further configured to receive the criteria via a user interface.

16. The system of claim 15, wherein the criteria comprises a search expression received via the user interface and wherein the management device is further configured to identify devices matching the search expression, by the management device, from criteria of devices identified in a database of the management device.

17. The system of claim 11, wherein the management device is further configured to:
subsequently identify a new flow between one of the subset of initiator endpoints and one of the first subset of devices or second subset of devices; and
responsive to the identification of the new flow, add the new flow to the flow classification group.

18. The system of claim 15, wherein the management device is further configured to:
subsequently determine that a flow between one of the subset of initiator endpoints and one of the first subset of devices or second subset of devices has terminated; and
responsive to the determination that the flow has been terminated, remove the terminated flow from the flow classification group.

19. The system of claim 15, wherein the management device is further configured to extract, from a log generated by the management device via monitoring of the first plurality of communications flows, a subset of flows having the first subset of devices as endpoints, the log identifying each endpoint of a flow.

20. The system of claim 19, wherein monitoring of the first plurality of communications flows and generation of the log are performed prior to identifying the first subset of devices associated with the given criteria.

* * * * *